Patented Oct. 29, 1929

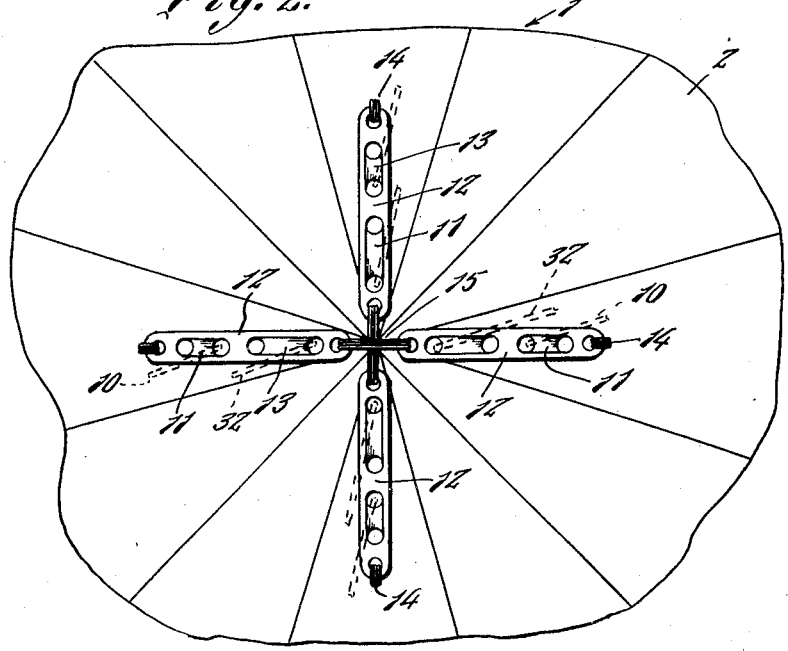
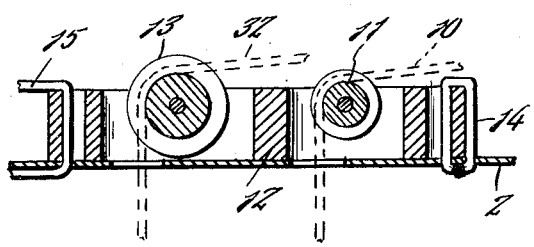
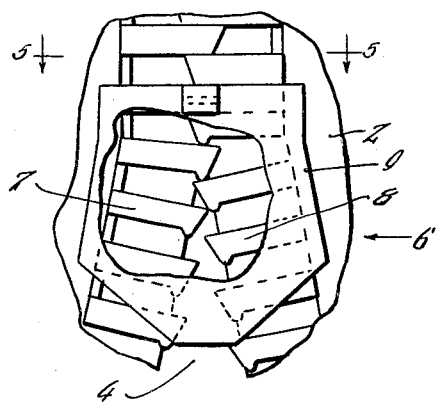

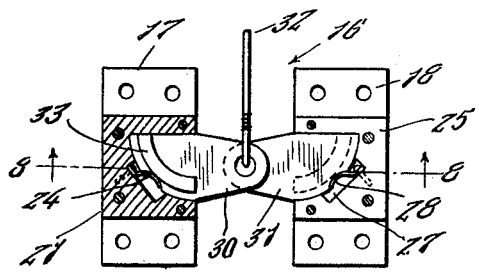
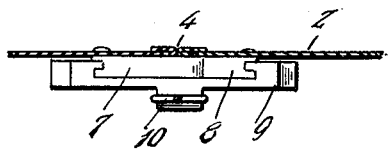
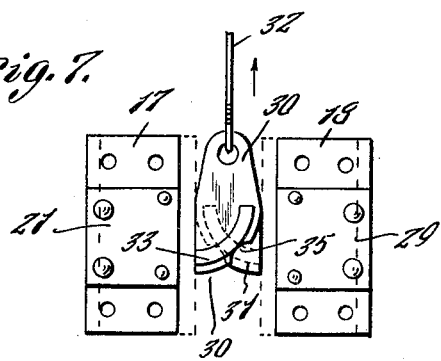
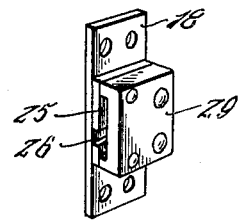
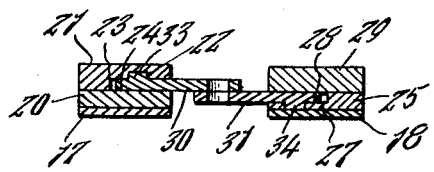
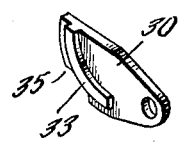

1,733,732

UNITED STATES PATENT OFFICE

JOHN M. HENVIS, OF PHILADELPHIA, PENNSYLVANIA

PARACHUTE-DEFLATING MEANS

Application filed January 31, 1929. Serial No. 336,417.

The present invention relates to improvements in parachutes that are associated with aeroplanes and has reference more particularly to a means for effecting the deflation of the parachute to prevent the same from dragging the plane along the ground in a heavy wind.

One of the important objects of the present invention is to provide a parachute that is formed with a series of radial slits, that are normally closed through the medium of a slide operated fastening means for each slit, a slider being associated with each slit and so arranged with the fastening means for effecting the opening or closing of the same from a remote point.

Another important object is to provide a device of the above mentioned character, wherein a circular reinforcing seam extends around the parachute, a suitable lock being arranged at the intersection of the circular seam with each of the radial slits, said locks further tending to prevent the accidental opening of the fastening means provided for each of the radial slits, the locking means being released also from a remote point and within easy access of the pilot of the aeroplane.

A still further object is to provide a parachute construction of the above mentioned character which is simple and inexpensive, yet strong and durable, and further well adapted for the purposes for which it is designed.

Other objects and advantages of the invention will become apparent as the nature of the invention proceeds and when taken in connection with the accompanying drawings.

In the accompanying drawings:

Figure 2 is a fragmentary top plan view of a central portion of the parachute for more clearly disclosing the radially disposed pulley supporting frames.

Figure 3 is a longitudinal sectional view through one of the frames and the pulleys mounted therein.

Figure 4 is a fragmentary detail of the separable fastening means provided for each of the radial slits.

Figure 5 is a transverse section taken approximately on the line 5—5 of Figure 4, looking in the direction of the arrows.

Figure 6 is a detail of the locking means associated with the circular seam, said locking means being disclosed in its closed or operative position.

Figure 7 is a similar view showing the locking device in an open position.

Figure 8 is a sectional view taken approximately on the line 8—8 of Figure 6.

Figure 9 is a detail perspective view of one of the plates of the locking device, showing the housing arranged thereon for accommodating the respective locking key, and Figure 10 is a detail perspective view of one of the locking keys or dogs.

Figure 1:
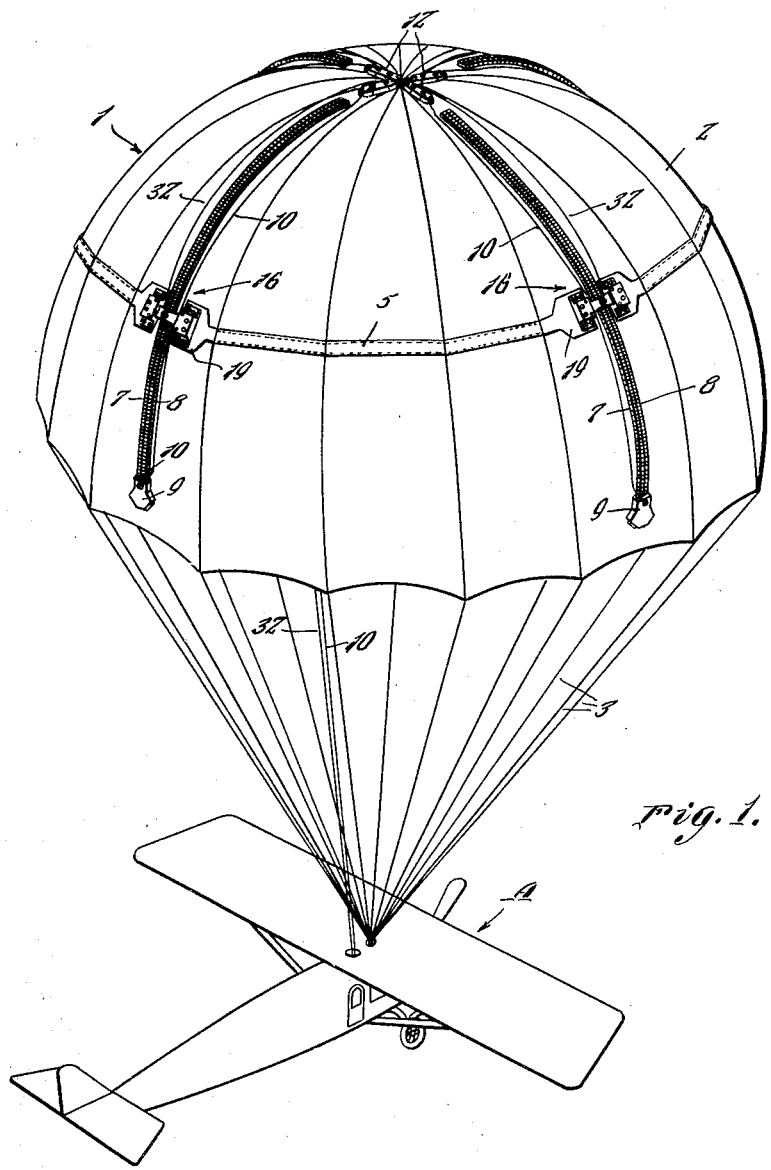
Figure 1 is a perspective view of an aeroplane equipped with my improved parachute, the latter being shown in an operative position.

In the drawings, wherein for the purpose of illustration is shown the preferred embodiment of my invention, the numeral 1 designates generally my improved parachute, the same including the fabric body 2 that is operatively attached to an aeroplane A through the medium of the cables 3, the fabric body 2 is formed at equi-distantly spaced points with the radial slits 4, and each slit extends from a point adjacent the crown or top portion of the body to a point adjacent the lower free edge thereof as clearly shown in Figure 1. Reinforcing seam 5 extends circumferentially around the body and while I have shown only one of such seams, it is to be understood that any number of these reinforcing seams may be provided, as desired.

Each of the radial slits 4 is normally held closed through the medium of a separate fastener structure shown generaly at 6, in Figure 4, and this separable fastener comprises the provision of complementary interlocking door members 7 and 8 that are attached to the respective edges of the slit, the jaw members 7 being arranged in alternate relation with respect to the complementary jaw members 8 and cooperating with the jaw members for effecting the opening and closing of the same is a slider 9. As this particular type of separable fastener is well known, a further detailed description thereof is deemed unnecessary. An operating cable 10 is attached to each slider. Each cable 10 is trained over a suitable pulley 11, mounted in the outer end portion of the respective frame 12, an additional pulley 13 being mounted in the inner end portion of each frame 12 as more clearly disclosed in Figures 2 and 3.

There are four of such frames provided and the same are arranged radially at the top or crown portion of the body 2 and upon referring to Figures 2 and 3, it will be observed that the outer end portion of each frame is attached to the adjacent portion of the body by suitable fastening means indicated at 14. The inner end portions of the radially disposed frames are not attached to the body but are attached to the opposed ends of the frames by the fastening means indicated at 15. The purpose of the pulley 13 will be presently described.

The converging cables 10 are adapted to extend downwardly through a suitable opening provided in the top portion of the body and the free ends of these cables extend downwardly into the cockpit of the aeroplane within easy reach of the pilot, whereby the opening and closing of the separable fastener for each of the radial slits 4 may be controlled by the pilot.

A lock denoted generally by the numeral 16 is associated at each point of intersection of the cross beam 5 with the radially disposed slits 4. These locks serve to hold the strain of the circular reinforcing seam and furthermore cooperate to prevent the accidental opening of the closing means provided for the radial slits. It is necessary to open the locks 16 before the separable fasteners for the radial slits can be moved into an open position to effect the deflation of the parachute when landing the aeroplane. The lock 16 includes the provision of a pair of plates 17 and 18 respectively, the same being secured on opposite sides of each radial slit 4 to the respective flat 19 that is formed at the respective ends of the sectional reinforcing seam 5. A strip 20 is secured on the outer face of the intermediate portion of the plate 17 and a housing 21 is in turn secured over the outer face of the strip 20. Formed in the intermediate portion of the plate 17 is the arcuate channels 22 and at one side of this channel there is formed a recess 23, within which is secured a leaf spring 24, the purpose of which will be presently described.

A strip 25 similar to the strip 20 is secured on the outer face of the intermediate portion of the complementary plate 18 and this strip 25 is formed with an arcuate channel 26 similar to the arcuate channel formed in the outer face of the plate 17. A recess 27 is also formed in the strip 25 for communication with the arcuate channel 26 and a leaf spring 28 is secured in this recess 27. A housing 29 is arranged over the strip 25. The inner opposed side of the housings 21 and 29 are open to accommodate the cam shaped locking keys or dogs 30 and 31 respectively. The inner opposed ends of these locking keys or dogs are arranged in overlapping relation and are formed with registering openings through which extends and affords a means of connecting the dogs together is cable for cord 32. The outer end of the dog or key 30 is adapted to operate within a cutout portion formed therefor in the plate 17 and formed on one side of the outer end portion of the locking key or dog 30 is the arcuate shaped rib 33 that is adapted to cooperate with the arcuate channel 22. The similar rib 34 is formed on one face of the outer end portion of the complementary locking key for cooperation with the arcuate channel 26 and the curved edge of each locking key or dog is formed with a notch 36 for cooperation with the respective leaf spring as shown in Figure 6, to maintain the locking keys in a horizontally disposed operative position whereby the plates 17 and 18 of each lock are secured together and the locking keys will extend across the respective radial slits 4.

The operating cords 32 extend in converging relation toward the top of the body 2 and are trained over the respective pulleys 13 mounted in the frames 12 and the free ends of these operating cords 32 extend through the opening in the top of the body to which the operating cords or cables 10 extend and also through the openings in the top of the plane A within reach of the pilot.

To operate the deflation apparatus, the pilot upon reaching a safe distance from the ground may open the locks 16 by pulling on the cords 32 so that all of the locks will be simultaneously opened and when these cords are actuated, the locking keys 30 and 31 are entirely disengaged from the respective keepers as suggested in Figure 7. Then the pilot pulls on the cords 10, which actuate the slider 9 in such a manner as to disconnect the complementary locking jaws 7 and 8 whereby the seams 4 will be closed and upon opening the seams 4, the air is permitted to escape through the radial slits, thus deflating the parachute and preventing the same from dragging the aeroplane along the ground in a heavy wind and causing considerable damage to the plane.

The provision of a parachute of the above mentioned character will enable a safe landing to be made and this without causing any damage to the aeroplane or injury to the occupants. Furthermore, the opening of the locking means, as well as the opening of the closures for the radial slit will only take a fraction of a minute and the control means for said elements is located within easy reach of a pilot so that the same may be actuated whenever necessary. It is of course to be understood that the radial slits must be manually closed, as must also the locking means 16, before ascending so that the parachute will be ready to function to sustain the aeroplane should any unforeseen accident happen while the plane is in flight and when said parachute is released, the same will function in the same manner as a conventional parachute that is attached to an aeroplane.

While I have shown the preferred embodiment of my invention, it is to be understood that various changes in the shape, size and arrangement of parts may be resorted to without departing from the spirit of the invention or the scope of the appended claims.

I claim:

1. A parachute comprising a pliable body formed with radial slits for effecting the deflation of a parachute, and means for normally closing the slits, means for actuating said closing means from a remote point to simultaneously open all of the slits, and additional locking means carried by the body for disposition across the respective radial slits to normally prevent the opening of the radial slits.

2. A parachute comprising a pliable body formed with radial slits for effecting the deflation of a parachute, and means for normally closing the slits, means for actuating said closing means from a remote point to simultaneously open all of the slits, additional means carried by the body for disposition across the respective radial slits to normally prevent the opening of the radial slits, and means for opening the last mentioned locking means from a remote point to permit the opening of the closure means for the radial slits.

3. A parachute for attachment to an aeroplane comprising a pliable body formed with radial slits to permit the deflation of the parachute, means for normally closing the radial slits, said means including interlocking jaw members attached to the respective edges of each slit, a slider movable along the interlocking jaws, said interlocking jaws being disposed in an operative position to close the slit when the slider is at the outer end of each radial slit, and cords attached to the respective sliders at one end, the other ends of the cords converging and extending through an opening in the top of the body and downwardly within reach of the occupants of the aeroplane whereby all of said sliders may be simultaneously actuated to open the interlocking jaws as described.

4. A parachute for attachment to an aeroplane comprising a pliable body formed with radial slits to permit the deflation of the parachute, means for normally closing the radial slits, said means including interlocking jaw members attached to the respective edges of each slit, a slider movable along the interlocking jaws, said interlocking jaws being disposed in an operative position to close the slit when the slider is at the outer end of each radial slit, and cords attached to the respective sliders at one end, the other ends of the cords converging and extending through an opening in the top of the body and downwardly within reach of the occupants of the aeroplane whereby all of said sliders may be simultaneously actuated to open the interlocking jaws as described, and additional locking means extending across the slits for preventing the opening of the radial slit fastening means, said additional locking means being released from a remote point.

5. A parachute comprising a pliable body formed with radial slits for effecting the deflation of a parachute, and means for normally closing the slits, and means for actuating said closing means from a remote point to simultaneously open all of the slits, and additional locking means carried by the body for disposition across the respective radial slits to normally prevent the opening of the radial slits, said last mentioned locking means comprising a pair of members secured on opposite sides of each radial slit, the inner opposed faces of the members being open, each member being formed with a pocket, complementary cam shaped keys having their outer end portions operable within the pockets, the inner opposed ends of the keys being operatively connected together, and a keeper connected to the inner ends of the keys for actuating the same to entirely disengage the keys from the pockets in said members.

6. A parachute comprising a pliable body formed with radial slits for effecting the deflation of a parachute, and means for normally closing the slits, and means for actuating said closing means from a remote point to simultaneously open all of the slits, and additional locking means carried by the body for disposition across the respective radial slits to normally prevent the opening of the radial slits, said last mentioned locking means comprising a pair of members secured on opposite sides of each radial slit, the inner opposed faces of the members being open, each member being formed with a pocket, complementary cam shaped keys having their outer end portions operable within the pockets, the inner opposed ends of the keys being operatively connected together, and a keeper connected to the inner ends of the keys for actuating the same to entirely disengage the keys from the pockets in said members, and cooperating means within the pockets and the respective keys for securing the latter in the pockets against casual displacement therefrom.

In testimony whereof I affix my signature.

JOHN M. HENVIS.